United States Patent
Yu et al.

(10) Patent No.: US 10,743,365 B2
(45) Date of Patent: Aug. 11, 2020

(54) METHOD, APPARATUS AND SYSTEM FOR DATA CONNECTION MANAGEMENT

(71) Applicant: Huawei Technologies Co., Ltd., Shenzhen (CN)

(72) Inventors: Yijun Yu, Shanghai (CN); Youyang Yu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/241,357

(22) Filed: Jan. 7, 2019

(65) Prior Publication Data
US 2019/0141780 A1 May 9, 2019

Related U.S. Application Data

(63) Continuation of application No. 15/495,747, filed on Apr. 24, 2017, now Pat. No. 10,219,316, which is a (Continued)

(51) Int. Cl.
*H04W 76/28* (2018.01)
*H04W 76/22* (2018.01)
(Continued)

(52) U.S. Cl.
CPC ......... *H04W 76/28* (2018.02); *H04L 12/1407* (2013.01); *H04L 41/0893* (2013.01);
(Continued)

(58) Field of Classification Search
CPC ............ H04L 12/1407; H04L 41/0893; H04M 15/66; H04M 15/8214; H04M 15/8228;
(Continued)

(56) References Cited

U.S. PATENT DOCUMENTS 6,621,793 B2* 9/2003 Widegren ......... H04W 12/0808
370/230.1
2001/0046220 A1 11/2001 Koo et al.
(Continued)

FOREIGN PATENT DOCUMENTS

CN 1956451 A 5/2007
CN 101286909 A 10/2008
(Continued)

OTHER PUBLICATIONS

Ericsson, et al., "ADC Rule Handling as PCEF Enhancement," 3GPP TSG SA WG2 Meeting #85, TD S2-112283, Agenda Item SAPP, Xi'An, China, May 2011, 5 pages.
(Continued)

*Primary Examiner* — Stephen J Clawson
(74) *Attorney, Agent, or Firm* — Slater Matsil, LLP

(57) ABSTRACT

Embodiments of the present disclosure provide a method, an apparatus and a system for data connection management. The method for data connection management includes: obtaining, by a user equipment UE, first instruction information, wherein the first instruction information is used for instructing to close or open a data connection; and transmitting, by the UE, the first instruction information to a packet data network gateway P-GW, for enabling the P-GW to stop or start data transmission of at least one bearer of the UE according to the first instruction information.

15 Claims, 7 Drawing Sheets

---

S101
a UE obtains first instruction information, wherein the first instruction information is used for instructing to close or open a data connection S102
the UE transmits the first instruction information to a P-GW, for enabling the P-GW to stop or start data transmission of at least one bearer of the UE according to the first instruction information

Related U.S. Application Data continuation of application No. 14/594,575, filed on Jan. 12, 2015, now Pat. No. 9,674,889, which is a continuation of application No. PCT/CN2012/078810, filed on Jul. 18, 2012.

(51) Int. Cl.

| | | |
|---|---|---|
| *H04W 76/34* | (2018.01) | |
| *H04W 76/12* | (2018.01) | |
| *H04L 12/14* | (2006.01) | |
| *H04L 12/24* | (2006.01) | |
| *H04M 15/00* | (2006.01) | |
| *H04W 4/24* | (2018.01) | |
| *H04W 72/04* | (2009.01) | |
| *H04W 76/11* | (2018.01) | |

(52) U.S. Cl.
CPC ....... *H04M 15/66* (2013.01); *H04M 15/8214* (2013.01); *H04W 4/24* (2013.01); *H04W 72/0406* (2013.01); *H04W 76/11* (2018.02); *H04W 76/12* (2018.02); *H04W 76/22* (2018.02); *H04W 76/34* (2018.02); *H04M 15/8228* (2013.01)

(58) Field of Classification Search
CPC ....... H04W 4/24; H04W 76/11; H04W 76/12; H04W 76/22; H04W 76/28; H04W 76/34
See application file for complete search history.

(56) References Cited

U.S. PATENT DOCUMENTS

| | | | |
|---|---|---|---|
| 2002/0163938 A1 | 11/2002 | Tuomainen et al. | |
| 2004/0077374 A1* | 4/2004 | Terry | H04W 36/14 455/552.1 |
| 2006/0126565 A1 | 6/2006 | Shaheen | |
| 2007/0275707 A1* | 11/2007 | Kwak | H04W 60/04 455/414.2 |
| 2008/0090573 A1 | 4/2008 | Kim et al. | |
| 2010/0056147 A1 | 3/2010 | Sun et al. | |
| 2010/0124223 A1 | 5/2010 | Gibbs et al. | |
| 2010/0257589 A1 | 10/2010 | Zhao | |
| 2011/0044283 A1 | 2/2011 | Rubin et al. | |
| 2011/0080890 A1 | 4/2011 | Cai et al. | |
| 2011/0099604 A1 | 4/2011 | Zhou et al. | |
| 2011/0134869 A1* | 6/2011 | Hirano | H04L 29/12311 370/329 |
| 2012/0002537 A1* | 1/2012 | Bao | H04W 24/04 370/221 |
| 2012/0069817 A1 | 3/2012 | Ling et al. | |
| 2013/0273900 A1 | 10/2013 | Iwai et al. | |
| 2013/0294293 A1 | 11/2013 | Iwai | |
| 2014/0254483 A1 | 9/2014 | Zisimopoulos | |
| 2014/0301194 A1* | 10/2014 | Mattsson | H04W 76/28 370/230 |
| 2014/0314088 A1 | 10/2014 | Li et al. | |
| 2014/0378114 A1 | 12/2014 | Lim et al. | |
| 2015/0071143 A1 | 3/2015 | Wang | |
| 2018/0070289 A1* | 3/2018 | Tamura | H04M 11/00 |

FOREIGN PATENT DOCUMENTS

| | | |
|---|---|---|
| CN | 101321382 A | 12/2008 |
| CN | 101472256 A | 7/2009 |
| CN | 101742452 A | 6/2010 |
| CN | 101742453 A | 6/2010 |
| CN | 102209357 A | 10/2011 |
| CN | 102291295 A | 12/2011 |
| EP | 2299770 A1 | 3/2011 |
| EP | 2384080 A2 | 11/2011 |
| WO | 2012012788 A1 | 1/2012 |
| WO | 2012093433 A1 | 7/2012 |
| WO | 2012093434 | 7/2012 |

OTHER PUBLICATIONS

Hitachi, "Online Small Data Transfer using NAS," SA WG2 Meeting #86 52-113043 (revision of S2-11xxxx), Naantali, Finland, Jul. 11-15, 2011, 5 pages.

Huawei, "Correction for Suspend Procedure in CSFB," Change Request Form, 3GPP TSG SA WG2 Meeting #78, S2-101061, San Francisco, USA, Feb. 2010, 12 pages.

NEC, "Scenario: Energy Awareness with PDN Connection State and Processing Reduction," 3GPP SA WG2 Meeting #91, S2-122313, Agenda Item 8.9, Kyoto, Japan, May 2012, 5 pages.

Motorola, "UE Initiated Suspend Request," 3GPP TSG SA WG2 Meeting #78, S2-101480, Feb. 22-26, 2010, San Francisco, USA, 3 pages.

3rd Generation Partnership Project; Technical Specification Group Services and System Aspects; General Packet Radio Service (GPRS); Service description; Stage 2 (Release 10), 3GPP TS 23.060 V10.5.0 (Sep. 2011), 51 pages.

Ericsson, "Suspend handling and other corrections," 3GPP TSG-SA WG2 Meeting #78, S2-101332, Feb. 22-26, 2010, San Francisco, USA, 14 pages.

* cited by examiner

METHOD, APPARATUS AND SYSTEM FOR DATA CONNECTION MANAGEMENT

CROSS-REFERENCE TO RELATED APPLICATIONS

This application is a continuation of U.S. patent application Ser. No. 15/495,747, filed on Apr. 24, 2017, which is a continuation of U.S. patent application Ser. No. 14/594,575, filed on Jan. 12, 2015, now U.S. Pat. No. 9,674,889, which is a continuation of International Application No. PCT/CN2012/078810, filed on Jul. 18, 2012. All of the aforementioned patent applications are hereby incorporated by reference in their entireties.

TECHNICAL FIELD

The present disclosure relates to a field of communications technologies, and in particular, to a method, an apparatus and a system for data connection management.

BACKGROUND

In order to adapt to requirements of a variety of aspects, such as a service bandwidth, a quality of service, a network coverage and the like, a 3G (3rd-Generation, third generation mobile communication technology) standard proposes a new evolution technology. EPS (Evolved Packet System) is a latest evolution standard of 3G UMTS (Universal Mobile Telecommunications System) formulated by a 3GPP (The 3rd Generation Partnership Project, the third generation partnership project) organization, generally known as 4G or SAE (System Architecture Evolution). Compared with a 3G technology, one of characteristics of EPS is that only a packet system domain (PS) is retained in a core network and a circuit switch domain (CS) is discarded.

An EPS network provides a data channel of a mobile network, so that a UE (User Equipment) is supported to access to an internet through the EPS network, realizing transmission of a data service in the internet. In the EPS network, in order to better improve a user experience, the EPS network sets up a data channel for the UE in a network attachment process of the UE, namely a default bearer, so as to ensure that the UE may immediately initiate the data service after finishing the attachment, i.e., the so-called "Always-on" function. The EPS network supporting the always on function is another main characteristic compared with the 3G technology.

However, a popularity of intelligent terminals brings a large amount of background data traffic, for example, consumption of data traffics such as an OS (Operation System) heartbeat, an automatic software upgrade detection, a background program networking update and the like, the consumption of this additional data traffic generally occurs when the UE performs no data service, so the "always on" of the UE enables the UE to access to the internet while being attached to the EPS network, which also provides conditions for the consumption of the above-mentioned large amount of background data traffic while providing better user experience to a user. The consumption of the background traffic may not be perceived by the user and the UE maintains always on, so the consumption of the background traffic can not be effectively controlled, thus increasing an additional cost of the user and influencing the user experience.

SUMMARY

In order to effectively control a traffic of a user equipment, embodiments of the present disclosure provide a method, an apparatus and a system for data connection management. Technical solutions are as follows.

On one hand, a method for data connection management is provided. The method includes obtaining, by a user equipment (UE), first instruction information, wherein the first instruction information is used for instructing to close or open a data connection. The method also includes transmitting, by the UE, the first instruction information to a packet data network gateway (P-GW), for enabling the P-GW to stop or start data transmission of at least one bearer of the UE according to the first instruction information.

On another hand, a method for data connection management is provided, including: receiving, by a packet data network gateway (P-GW), first instruction information transmitted by a user equipment (UE), wherein the first instruction information is used for instructing to close or open a data connection; and stopping or starting, by the P-GW, data transmission of at least one bearer of the UE according to the first instruction information.

On another hand, a user equipment (UE) is provided, including: an obtaining module, configured to obtain first instruction information, wherein the first instruction information is used for instructing to close or open a data connection; and a transmitting module, configured to transmit the first instruction information to a packet data network gateway (P-GW), for enabling the P-GW to stop or start data transmission of at least one bearer of the UE according to the first instruction information.

On another hand, a packet data network gateway (P-GW) is provided, including: a receiving module, configured to receive first instruction information transmitted by a user equipment (UE), wherein the first instruction information is used for instructing to close or open a data connection; and a control module, configured to stop or start data transmission of at least one bearer of the UE according to the first instruction information.

The technical solutions provided by the embodiments of the present disclosure have beneficial effects as follows. When the UE implements closing or opening data connection, the UE obtains the first instruction information used for instructing to close or open the data connection. The UE transmits the first instruction information to the P-GW of a network side, for enabling the P-GW to stop or start the data transmission of at least one bearer of the UE according to the first instruction information. In this way, the UE is unnecessary to be "always on", that is to say, when the UE is not in a use state, the UE implements closing the data connection, and the corresponding network side P-GW stops the data transmission of at least one bearer of the UE, such that consumption of background data traffic caused by the "always on" of the UE may be avoided, and a traffic of a terminal may be effectively controlled, thus an additional cost of a user may be reduced.

BRIEF DESCRIPTION OF THE DRAWINGS

To illustrate technical solutions in the embodiments of the present disclosure more clearly, a brief introduction on the accompanying drawings which are needed in the description of the embodiments may be given below. Apparently, the accompanying drawings in the description below are merely some of the embodiments of the present disclosure, based on which other drawings may be obtained by those of ordinary skill in the art without any creative efforts.

DETAILED DESCRIPTION OF ILLUSTRATIVE EMBODIMENTS

To make objectives, technical solutions and advantages of the present disclosure clearer, a further detailed description of the implementations of the present disclosure will be given below, in combination with the accompanying drawings.

Figure 1:
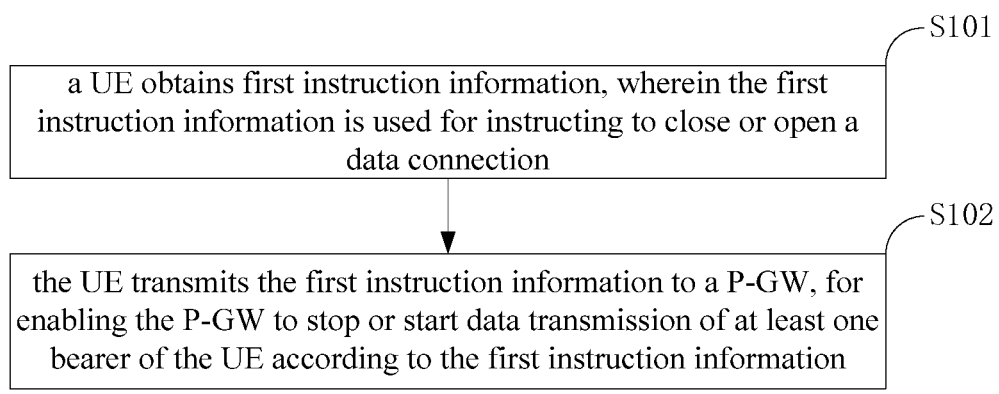
FIG. 1 is a flowchart of an embodiment of a method for data connection management provided by an embodiment of the present disclosure.

FIG. 1 is a flowchart of an embodiment of a method for data connection management provided by an embodiment of the present disclosure. The method for data connection management includes the following steps.

S101: a UE obtains first instruction information, wherein the first instruction information is used for instructing to close or open a data connection;

S102: the UE transmits the first instruction information to a P-GW (Packet Data Network Gateway, PDN GW), for enabling the P-GW to stop or start data transmission of at least one bearer of the UE according to the first instruction information.

In this embodiment, when the UE implements closing or opening the data connection, the UE obtains the first instruction information used for instructing to close or open the data connection; and the UE transmits the first instruction information to the P-GW of a network side, for enabling the P-GW to stop or start the data transmission of at least one bearer of the UE according to the first instruction information, in this way, the UE may determine to close or open the data connection according to a service requirement or a user demand, when the data connection is closed, a data packet could not be transmitted through a mobile network, thereby avoiding an additional charge generated by consumption of background data traffic in a condition of being unperceived by a user; and when needing to perform a service, the user starts the closed data connection to perform service processing. In this way, the consumption of the background data traffic caused by "always on" of the UE may be avoided, and a traffic of the UE may be effectively controlled, thus an additional cost of the user may be reduced and a user experience may be improved.

Figure 2:
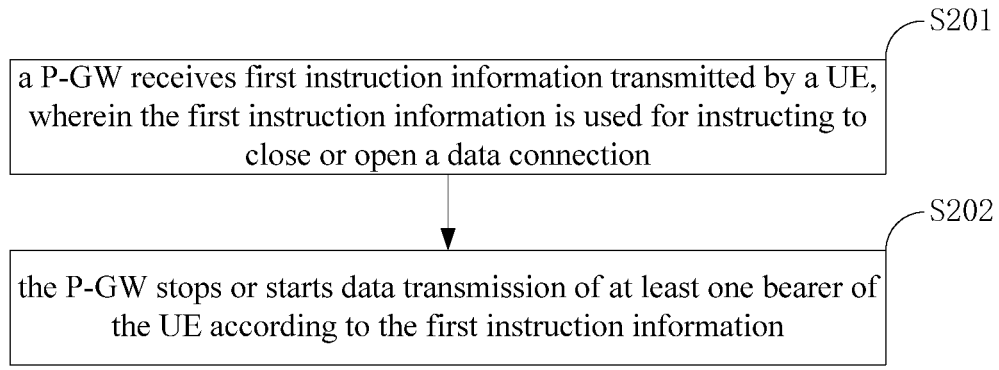
FIG. 2 is a flowchart of another embodiment of a method for data connection management provided by an embodiment of the present disclosure.

FIG. 2 is a flowchart of another embodiment of a method for data connection management provided by an embodiment of the present disclosure. The method for data connection management includes the following steps.

S201: a P-GW receives first instruction information transmitted by a UE, wherein the first instruction information is used for instructing to close or open a data connection;

S202: the P-GW stops or starts data transmission of at least one bearer of the UE according to the first instruction information.

In this embodiment, when the UE implements closing or opening the data connection, the P-GW receives the first instruction information transmitted by the UE and used for instructing to close or open the data connection; and the P-GW stops or starts the data transmission of at least one bearer of the UE according to the first instruction information. In this way, the UE may determine to close or open the data connection according to a service requirement or a user demand, when the data connection is closed, a data packet could not be transmitted through a mobile network, thereby avoiding an additional charge generated by consumption of background data traffic in a condition of being unperceived by a user; and when needing to perform a service, the user starts the closed data connection to perform service processing. In this way, the consumption of the background data traffic caused by "always on" of the UE may be avoided, and a traffic of the UE may be effectively controlled, thus an additional cost of the user may be reduced and a user experience may be improved.

Figure 3:
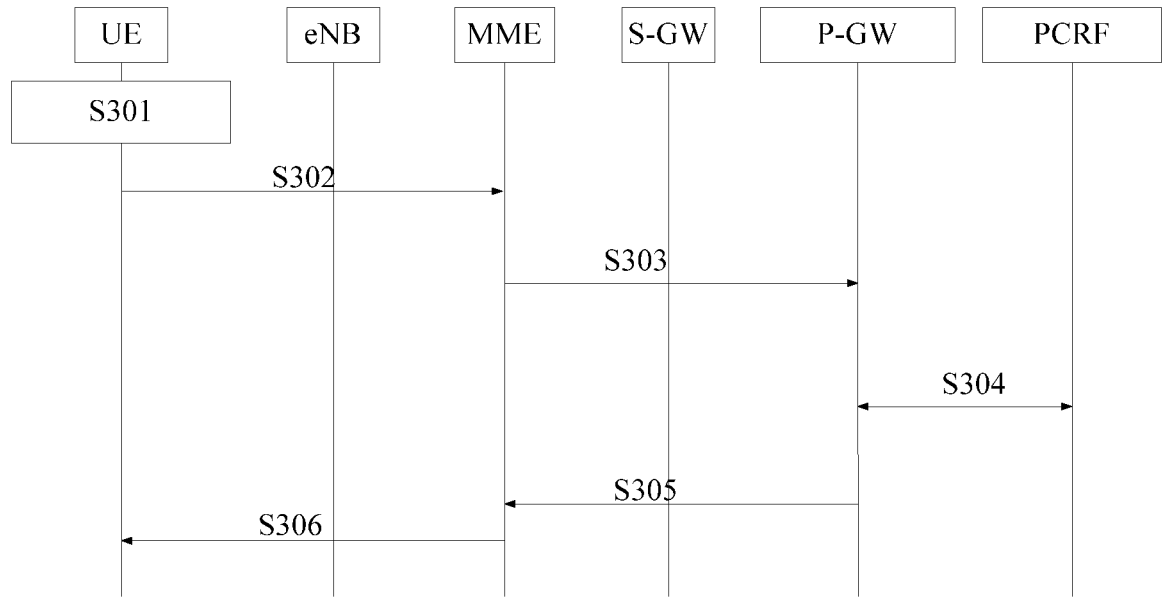
FIG. 3 is a flowchart of yet another embodiment of a method for data connection management provided by an embodiment of the present disclosure.

FIG. 3 is a flowchart of yet another embodiment of a method for data connection management provided by an embodiment of the present disclosure. In this embodiment, when a UE closes or opens a data connection, the UE notifies a P-GW of a network side to implement closing or opening the data connection in a signaling manner; wherein a data connection update request sent by the UE comprises first instruction information, and the first instruction information is used for instructing to close or open the data connection.

The method for data connection management includes the following steps.

S301: a UE obtains first instruction information, wherein the first instruction information is used for instructing to close or open a data connection.

In this embodiment, the UE attached to an EPS network maintains an attachment state, when the UE implements processing of closing or opening the data connection, the UE obtains the first instruction information, wherein the first instruction information is used for instructing to close or open the data connection.

Specifically, a user may trigger the UE to implement the processing of closing or opening the data connection. For example, the user enables the UE to implement the processing of closing or opening the data connection by running or operating an application program on the UE. The application program may be a built-in application program of the UE (e.g., a built-in software or function of a UE operation system), and may also be an application program additionally installed on the UE. The UE obtains the first instruction information. The UE may also implement the processing of closing or opening the data connection according to a configured policy. For example, when the configured policy is to close the data connection in the case of UE standby (e.g., screen off) and to open the data connection in the case of non-standby (e.g., screen on), the UE implements the processing of closing or opening the data connection according to the policy.

In this embodiment, the UE may also set a first policy for at least one bearer of the UE according to the first instruction information, wherein the first policy is used for stopping or starting the data transmission of at least one traffic flow in the at least one bearer; and the UE stops or starts the data transmission of the at least one traffic flow according to the first policy.

S302: the UE sends a data connection update request to an MME (Mobility Management Entity), wherein the data connection update request comprises the first instruction information.

In this step, the UE sends the data connection update request to the MME through an eNB (evolved Node B), wherein the data connection update request may be specifically a service request message, or a tracking area update request (TAU (tracking area update) Request) message, etc.

The first instruction information may exist in the data connection update request in a form of a data connection update request type, specifically, the data connection update request type may be to close the data connection or to open the data connection.

S303: the MME obtains the first instruction information from the data connection update request, and sends a modify bearer request to the P-GW through an S-GW (Serving Gateway), wherein the modify bearer request comprises the first instruction information.

In this step, the MME receives the data connection update request, obtains the first instruction information from the data connection update request, and sends the modify bearer request comprising the first instruction information to the S-GW; and the S-GW forwards the modify bearer request to the P-GW.

The modify bearer request may be specifically a modify bearer request message, or a modify bearer command message.

Specifically, when the data connection update request type is to close the data connection, namely the first instruction information is specifically used for instructing to close the data connection, the modify bearer request may be specifically a suspend notification message or the like. When the data connection update request type is to open the data connection, namely the first instruction information is specifically used for instructing to open the data connection, the modify bearer request may be specifically a resume notification message or the like.

S304: the P-GW obtains the first instruction information from the modify bearer request, and stops or starts data transmission of at least one bearer of the UE according to the first instruction information.

In this step, after obtaining the first instruction information from the modify bearer request, the P-GW determines whether to implement policy update processing with a PCRF (Policy and Charging Rules Function) according to a currently adopted preset policy, specifically, if the P-GW currently adopts a dynamic PCC (Policy and Charging Control) policy, the P-GW needs to implement the policy update processing with the PCRF, and the P-GW stops or starts the data transmission of at least one bearer of the UE according to the updated policy; if the P-GW does not adopt the dynamic PCC currently, but adopts such policies as static PCC or not needing PCC interaction according to a policy of an operator or the like, the P-GW does not need to implement the policy update processing with the PCRF, and directly stops or starts the data transmission of at least one bearer of the UE according to the first instruction information.

That the P-GW implements the policy update processing with the PCRF specifically includes: the P-GW sends an indication of IP-CAN (Internet Protocol-Connectivity Access Network) session modification message to the PCRF, wherein the indication of IP-CAN session modification message comprises the first instruction information; and the PCRF obtains the first instruction information from the indication of IP-CAN session modification message, implements corresponding policy update according to the first instruction information, and sends an acknowledge of IP-CAN session modification message to the P-GW; wherein the acknowledge of IP-CAN session modification message comprises an access control policy after the policy update processing. Specific flows are as follows.

When the first instruction information is used for instructing to close the data connection, the PCRF implements access control processing according to the first instruction information to obtain a first access control policy, wherein the first access control policy is used for instructing the P-GW to stop the data transmission of at least one bearer of the UE; the PCRF sends a first acknowledge of IP-CAN session modification message to the P-GW, wherein the first acknowledge of IP-CAN session modification message comprises the first access control policy. The first access control policy may be specifically a closing traffic flow instruction (for example, gating control is set as closed), or a stopping data packet transmission instruction.

When the first instruction information is used for instructing to open the data connection, the PCRF implements access control processing according to the first instruction information to obtain a second access control policy, wherein the second access control policy is used for instructing the P-GW to start the data transmission of at least one bearer of the UE; the PCRF sends a second acknowledge of IP-CAN session modification message to the P-GW, wherein the second acknowledge of IP-CAN session modification message comprises the second access control policy. The second access control policy may be specifically an opening traffic flow instruction (for example, gating control is set as open), or a starting data packet transmission instruction.

After the P-GW implements the policy update processing with the PCRF, the P-GW receives the acknowledge of IP-CAN session modification message, and stops or starts the data transmission of at least one bearer of the UE according to the access control policy after the policy update processing comprised in the acknowledge of IP-CAN session modification message.

In this step, that the P-GW stops or starts the data transmission of at least one bearer of the UE according to the first instruction information includes: the P-GW stops or starts the data transmission of at least one bearer of the UE according to the first instruction information; or the P-GW stops or starts the data transmission of at least one bearer of the UE according to the first access control policy or the second access control policy; or the P-GW stops the data transmission of at least one bearer of the UE according to the first instruction information and the first access control policy; or, the P-GW starts the data transmission of at least one bearer of the UE according to the first instruction information and the second access control policy.

That the P-GW stops the data transmission of at least one bearer of the UE specifically further includes: the P-GW stops the data transmission on all bearers of the UE; or the P-GW stops the data transmission on a particular bearer of the UE. Preferably, the P-GW may also implement bearer deletion processing to delete other bearers excluding a default bearer in the at least one bearer of the UE, or delete at least one appointed bearer excluding the default bearer in the at least one bearer; and stops the data transmission of the bearer not deleted in the at least one bearer of the UE according to the first instruction information. In this way, after the P-GW stops the data transmission of the bearer not deleted in the at least one bearer of the UE, if the P-GW receives a new downlink data packet of the UE subsequently, the P-GW may directly discard the downlink data packet and not implement a bearer update flow or a bearer setup flow. That the P-GW stops the data transmission of the bearer not deleted in the at least one bearer according to the first instruction information includes: the P-GW sets a second policy for the bearer not deleted according to the first instruction information, wherein the second policy is used for stopping the data transmission of at least one traffic flow in the bearer not deleted; and the P-GW stops the data transmission of at least one data flow according to the second policy.

That the P-GW implements the bearer deletion processing includes: the P-GW sends a delete bearer request message to the MME through the S-GW; the MME sends a deactivate EPS bearer context request message to the UE; the UE sends a deactivate EPS bearer context accept message to the MME; and the MME sends a delete bearer response message to the P-GW through the S-GW, to finish the bearer deletion processing.

In this embodiment, the UE may also receive a delete bearer request initiated by the P-GW to delete a part of bearers in the at least one bearer; the UE sets a second policy for the bearer not deleted in the at least one bearer according to the first instruction information, wherein the second policy is used for stopping the data transmission of at least one traffic flow in the bearer not deleted; and the UE stops the data transmission of at least one traffic flow according to the second policy.

That the P-GW starts the data transmission of at least one bearer of the UE specifically includes: the P-GW allows the data transmission of at least one bearer of the UE, subsequently, the P-GW may initiate a bearer setup flow or a bearer update flow according to a received downlink data packet, to finish the downlink data transmission of at least one bearer; and the P-GW forwards an uplink data packet when receiving the same, and allows to set up a new bearer for the UE.

In this embodiment, that the P-GW starts the data transmission of at least one bearer of the UE according to the first instruction information includes: the P-GW sets a third policy for the at least one bearer according to the first instruction information, wherein the third policy is used for starting the data transmission of at least one traffic flow in the bearer not deleted; and the P-GW starts the data transmission of the at least one data flow according to the third policy.

S305: the P-GW sends a modify bearer response to the MME through the S-GW.

In this step, after stopping or starting the data transmission of the at least one bearer of the UE according to one or two instructions of the first instruction information, the first access control policy and the second access control policy, the P-GW sends the modify bearer response to the MME through the S-GW, to notify the S-GW and the MME that the P-GW has stopped or started the data transmission of the at least one bearer of the UE.

The modify bearer response may be specifically a modify bearer response message, an update bearer request message, a suspend acknowledge message or a resume acknowledge message, etc.

S306: the MME sends a data connection update response to the UE.

In this step, the data connection update response may be specifically a tracking area update accept (TAU Accept) message, the MME sends the data connection update response to the UE through the TAU Accept message, to notify the UE that the P-GW has finished the processing of stopping or starting transmission of data packets of the UE.

Or, the MME sends the data connection update response to the eNB through an initial context setup request message, to notify the eNB; and the eNB sends the data connection update response to the UE through a radio bearer setup request message, to notify the UE that the P-GW has finished the processing of stopping or starting transmission of data packets of the UE.

In this embodiment, when the UE implements the processing of closing the data connection, the UE may stop the sending of the uplink data packet at any moment during the above-mentioned S302 to S306, or may also stop the sending of the uplink data packet before S302 or after S306. When the UE implements the processing of opening the data connection, and if an uplink data packet needs to be sent currently, the UE needs to send the uplink data packet after S306.

In one implementation of this embodiment, the first instruction information includes second instruction information, wherein the second instruction information is used for instructing to close or open the data connection of a particular traffic flow, i.e., the second instruction information is used for instructing to close or open a part of data connections; correspondingly, the P-GW stops or starts the data transmission of at least one bearer of the particular traffic flow of the UE according to one or two instructions of the second instruction information, the first access control policy and the second access control policy.

When the UE closes or opens the data connection of the particular traffic flow, the first instruction information includes the second instruction information, namely, on the basis of including a data connection update request type, the first instruction information further includes the second instruction information of related information of the particular traffic flow. The data connection update request type is to close the data connection or to open the data connection; the related information of the particular traffic flow indicated by the second instruction information includes any one or more of identification information of the particular traffic flow and information of an application program corresponding to the particular traffic flow.

The identification information of the particular traffic flow includes any one or more of a source IP (Internet Protocol) address, a target IP address, a source port number, a target port number and a protocol type of the particular traffic flow; and the information of the application program corresponding to the particular traffic flow includes any one or more of an application program identifier (Application ID), an application program title and an application program serial number.

When the particular traffic flow is a plurality of traffic flows, the related information of the particular traffic flow correspondingly comprises a combination of the related information of the plurality of traffic flows.

In this embodiment, when the first instruction information includes the second instruction information and instructs to close the data connection of the particular traffic flow, if the particular traffic flow transmits the data packet by adopting a dedicated bearer, that the P-GW stops the data transmission of at least one bearer of the particular traffic flow of the UE according to the second instruction information includes: the P-GW may implement bearer deletion processing to delete the dedicated bearer corresponding to the particular traffic flow; the P-GW sets a limit policy for a bearer remaining after deletion of the UE according to the first instruction information and/or the first access control policy, wherein the limit policy is used for prohibiting the data transmission of at least one bearer of the particular traffic flow; wherein in the embodiments of the present disclosure, "/" expresses "or".

The bearer remaining after deletion of the UE includes: a bearer not configured with a TFT (Traffic Flow Template), for example a default bearer; a dedicated bearer for transmitting unclosed traffic flow data, etc. The limit policy may be a data packet filter comprising the related information of the particular traffic flow.

The P-GW stops the data transmission of at least one bearer of the particular traffic flow which is closed and instructed by the second instruction information, on the bearer remaining after deletion of the UE, according to the set limit policy.

In this case, if the P-GW receives a downlink data packet of other traffic flows excluding the closed particular traffic flow of the UE subsequently, the P-GW may initiate a bearer setup flow or a bearer update flow according to the downlink data packet of other traffic flows, to finish downlink data transmission of at least one bearer of other unclosed traffic flows.

If the P-GW sets the limit policy on the bearer remaining after deletion of the UE, for example, setting the data packet filter comprising the related information of the particular traffic flow, when the UE implements opening the data connection of the particular traffic flow, namely, the second instruction information instructs to open the particular traffic flow, the P-GW updates the limit policy, to enable the same to cancel the related information of the particular traffic flow to be open, and starts the data transmission of at least one bearer of the particular traffic flow. If the UE implements opening the data connection of all traffic flows, the P-GW cancels the limit policy and starts the data transmission of at least one bearer of all traffic flows. The above-mentioned updating or canceling the limit policy may be specifically that, the P-GW updates or cancels the limit policy on the bearer with the set limit policy, including the default bearer and the dedicated bearer.

In this embodiment, when the UE implements closing or opening the data connection, the UE obtains the first instruction information used for instructing to close or open the data connection; the UE transmits the first instruction information to the P-GW of a network side, the P-GW stops the data transmission of at least one bearer of the UE according to the first instruction information and/or a first access control policy, or the P-GW starts the data transmission of at least one bearer of the UE according to the first instruction information and/or a second access control policy, in this way, the UE is unnecessary to be "always on", that is to say, when the UE is not in a use state, the UE implements closing the data connection, and the corresponding network side P-GW stops the data transmission of at least one bearer of the UE, such that consumptions of background data traffics caused by the "always on" of the UE may be avoided, and a traffic of a terminal may be effectively controlled, thus a data traffic and an additional cost of a user may be saved and a user experience may be improved.

Figure 4:
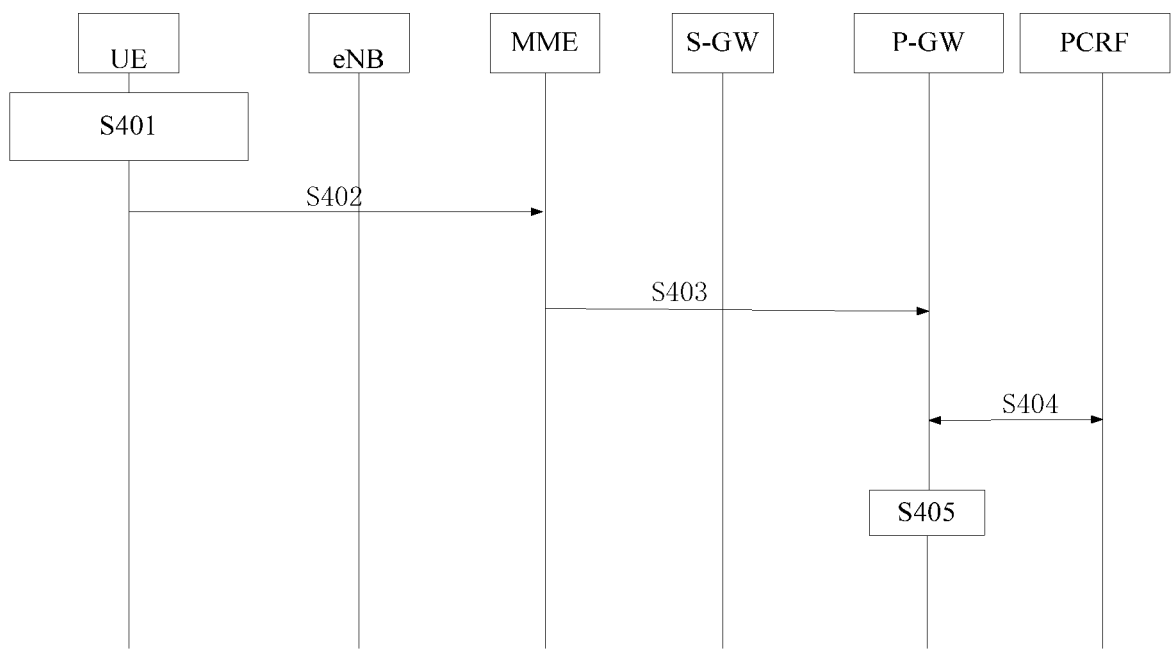
FIG. 4 is a flowchart of yet another embodiment of a method for data connection management provided by an embodiment of the present disclosure.

FIG. 4 is a flowchart of yet another embodiment of a method for data connection management provided by an embodiment of the present disclosure. In this embodiment, when a UE closes or opens a data connection, the UE notifies a P-GW of a network side to implement closing or opening the data connection in a signaling manner; wherein a request bearer resource modification message sent by the UE comprises first instruction information, and the first instruction information is used for instructing to close or open the data connection.

The method for data connection management includes the following steps.

S401: a UE obtains first instruction information, wherein the first instruction information is used for instructing to close or open a data connection.

S401 is similar to S301 in the above-mentioned embodiment, thus will not be repeated redundantly herein, and may specifically refer to related descriptions of S301.

S402: the UE sends a request bearer resource modification message to an MME, wherein the request bearer resource modification message comprises the first instruction information.

In this step, the UE sends the request bearer resource modification message to the MME through an eNB, wherein the request bearer resource modification message comprises the first instruction information.

S403: the MME obtains the first instruction information from the request bearer resource modification message, and sends a bearer resource command message to a P-GW through an S-GW, wherein the bearer resource command message comprises the first instruction information.

S404: the P-GW obtains the first instruction information from the bearer resource command message, and implements policy update processing with a PCRF.

In this step, after obtaining the first instruction information from the bearer resource command message, the P-GW determines whether to implement the policy update processing with the PCRF according to a currently adopted preset policy, specifically, if the P-GW currently adopts a dynamic PCC policy, the P-GW needs to implement the policy update processing with the PCRF, and the P-GW stops or starts the data transmission of at least one bearer of the UE according to the updated policy; if the P-GW does not adopt the dynamic PCC currently, but adopts such policies as static PCC or not needing PCC interaction according to a policy of an operator or the like, the P-GW does not need to implement the policy update processing with the PCRF, and directly stops or starts the data transmission of at least one bearer of the UE according to the first instruction information.

The process that the P-GW implements the policy update processing with the PCRF is similar to the process of the policy update processing in S304 in the above-mentioned embodiment, thus will not be repeated redundantly herein, and may specifically refer to related descriptions of S304.

S405: the P-GW stops or starts the data transmission of at least one bearer of the UE according to the first instruction information and/or an access control policy after the policy update processing received by the P-GW.

In this step, the P-GW receives an acknowledge of IP-CAN session modification message sent by the PCRF, and stops or starts the data transmission of at least one bearer of the UE according to the access control policy after the policy update processing, comprised in the acknowledge of IP-CAN session modification message.

Specifically, the P-GW may stop or start the data transmission on all bearers of the UE according to the access control policy; or, the P-GW stops the data transmission of at least one bearer of the UE according to the first instruction information and/or a first access control policy; or, the P-GW starts the data transmission of at least one bearer of the UE according to the first instruction information and/or a second access control policy.

That the P-GW stops the data transmission of at least one bearer of the UE specifically further includes: the P-GW stops the data transmission on all bearers of the UE; or the P-GW stops the data transmission on a particular bearer of the UE. Preferably, the P-GW may also implement bearer deletion processing to delete other bearers excluding a default bearer in the at least one bearer of the UE, or delete at least one appointed bearer excluding the default bearer in the at least one bearer; and stop the data transmission of the bearer not deleted in the at least one bearer of the UE according to the first instruction information. The process that the P-GW implements the bearer deletion processing is similar to the process of the bearer deletion processing in the method embodiment corresponding to FIG. 3, thus will not be repeated redundantly herein, and may specifically refer to related descriptions of the above-mentioned embodiment.

In this embodiment, the P-GW implements the bearer deletion processing, after deleting the other bearers excluding the default bearer in the at least one bearer of the UE, or deleting at least one appointed bearer excluding the default bearer in the at least one bearer, the P-GW may also implement a bearer update flow to send updated settings to the UE. Specifically, the P-GW sends an update bearer request message to the MME through the S-GW; the MME receives the update bearer request message, and sends a modify EPS (Evolved Packet System) bearer context request message, or a downlink NAS (Non Access Stratum) transport message to the UE; the UE receives the modify EPS bearer context request message or the downlink NAS transport message, and sends a modify EPS context accept, or an uplink NAS transport message to the MME; and the MME receives the modify EPS context accept message or the uplink NAS transport message, and sends an update bearer response message to the P-GW through the S-GW, to finish the bearer update flow.

The process that the P-GW starts the data packet transmission of the UE is similar to the processing process that the P-GW starts the data packet transmission of the UE in the method embodiment corresponding to FIG. 3, thus will not be repeated redundantly herein, and may specifically refer to related descriptions of the above-mentioned embodiment.

In one implementation of this embodiment, the first instruction information includes second instruction information, wherein the second instruction information is used for instructing to close or open the data connection of a particular traffic flow, i.e., the second instruction information is used for instructing to close or open a part of data connections; correspondingly, the P-GW stops or starts the data transmission of at least one bearer of the particular traffic flow of the UE according to the first instruction information including second instruction information. Related descriptions of the second instruction information are similar to those of the second instruction information in the method embodiment corresponding to FIG. 3, thus will not be repeated redundantly herein, and may specifically refer to related descriptions of the above-mentioned embodiment.

In this embodiment, when the UE implements closing or opening the data connection, the UE obtains the first instruction information used for instructing to close or open the data connection; the UE transmits the first instruction information to the P-GW of a network side, the P-GW stops the data transmission of at least one bearer of the UE according to the first instruction information and/or a first access control policy, or the P-GW starts the data transmission of at least one bearer of the UE according to the first instruction information and/or a second access control policy, in this way, the UE is unnecessary to be "always on", that is to say, when the UE is not in a use state, the UE implements closing the data connection, and the corresponding network side P-GW stops the data transmission of at least one bearer of the UE, such that consumptions of background data traffics caused by the "always on" of the UE may be avoided, and a traffic of a terminal may be effectively controlled, thus a data traffic and an additional cost of a user may be saved and a user experience may be improved.

Figure 5:
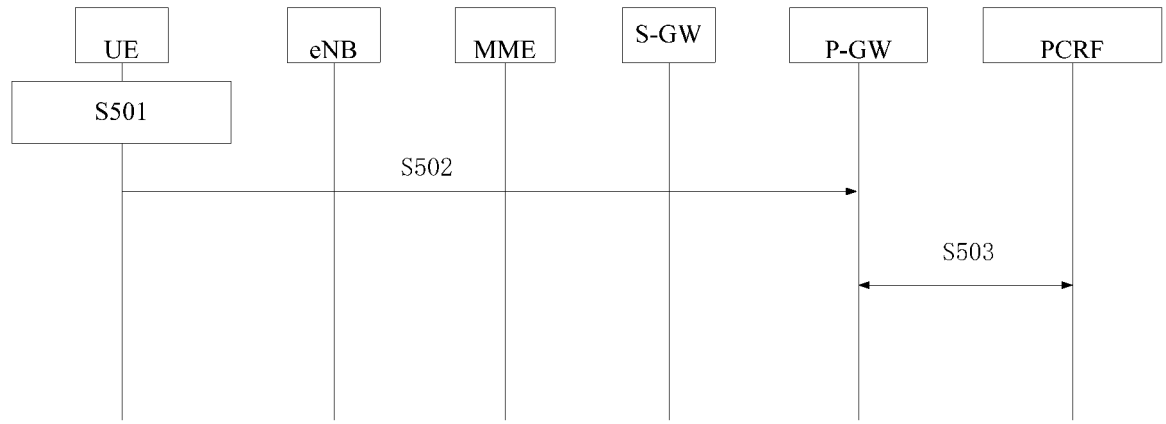
FIG. 5 is a flowchart of yet another embodiment of a method for data connection management provided by an embodiment of the present disclosure.

FIG. 5 is a flowchart of yet another embodiment of method for data connection management provided by an embodiment of the present disclosure. In this embodiment, when a UE closes or opens a data connection, the UE notifies a P-GW of a network side to implement closing or opening the data connection in a data packet manner through a preset channel; wherein a first appointed data packet sent by the UE comprises first instruction information, and the first instruction information is used for instructing to close or open the data connection.

The method for data connection management includes the following steps.

S501: a UE obtains first instruction information, wherein the first instruction information is used for instructing to close or open a data connection.

S501 is similar to S301 in the above-mentioned embodiment, thus will not be repeated redundantly herein, and may specifically refer to related descriptions of S301.

S502: the UE sends a first appointed data packet to a P-GW through a preset channel, wherein the first appointed data packet comprises the first instruction information.

In this step, the UE sends the first appointed data packet to the P-GW through the preset channel having been set up between the UE and the P-GW for the data connection, for example, a GTP (General packet radio service Tunnel Protocol) channel (specifically may be called a PDP (Packet Data Protocol) channel, or a bearer), wherein the first appointed data packet comprises the first instruction information, and the first instruction information is used for instructing to close or open the data connection.

S503: the P-GW obtains the first instruction information from the first appointed data packet, and stops or starts data transmission of at least one bearer of the UE according to the first instruction information.

In this step, the P-GW receives the first appointed data packet, and obtains the first instruction information from the first appointed data packet; then the P-GW stops or starts the data transmission of at least one bearer of the UE according to the first instruction information, including optionally implementing policy update processing with a PCRF, specifically, the process that the P-GW stops or starts the data transmission of at least one bearer of the UE according to the first instruction information is similar to S304 in the above-mentioned embodiment, thus will not be repeated redundantly herein, and may specifically refer to related descriptions of S304.

Optionally, the P-GW may also implement bearer deletion processing and bearer update processing, which may specifically refer to related descriptions in the method embodiments corresponding to FIG. 3 and FIG. 4, and will not be repeated redundantly herein.

In one implementation of this embodiment, the first instruction information includes second instruction information, wherein the second instruction information is used for instructing to close or open the data connection of a particular traffic flow, i.e., the second instruction information is used for instructing to close or open a part of data connections; correspondingly, the P-GW stops or starts the data transmission of at least one bearer of the particular traffic flow of the UE according to the first instruction information including second instruction information. Related descriptions of the second instruction information are similar to those of the second instruction information in the method embodiment corresponding to FIG. 3, thus will not be repeated redundantly herein, and may specifically refer to related descriptions of the above-mentioned embodiment.

In this embodiment, when the UE implements closing or opening the data connection, the UE obtains the first instruction information used for instructing to close or open the data connection; the UE transmits the first instruction information to the P-GW of a network side through the preset channel, the P-GW stops the data transmission of at least one bearer of the UE according to the first instruction information and/or a first access control policy, or the P-GW starts the data transmission of at least one bearer of the UE according to the first instruction information and/or a second access control policy, in this way, the UE is unnecessary to be "always on", that is to say, when the UE is not in a use state, the UE implements closing the data connection, and the corresponding network side P-GW stops the data transmission of at least one bearer of the UE, such that consumptions of background data traffics caused by the "always on" of the UE may be avoided, and a traffic of a terminal may be effectively controlled, thus a data traffic and an additional cost of a user may be saved and a user experience may be improved.

Figure 6:
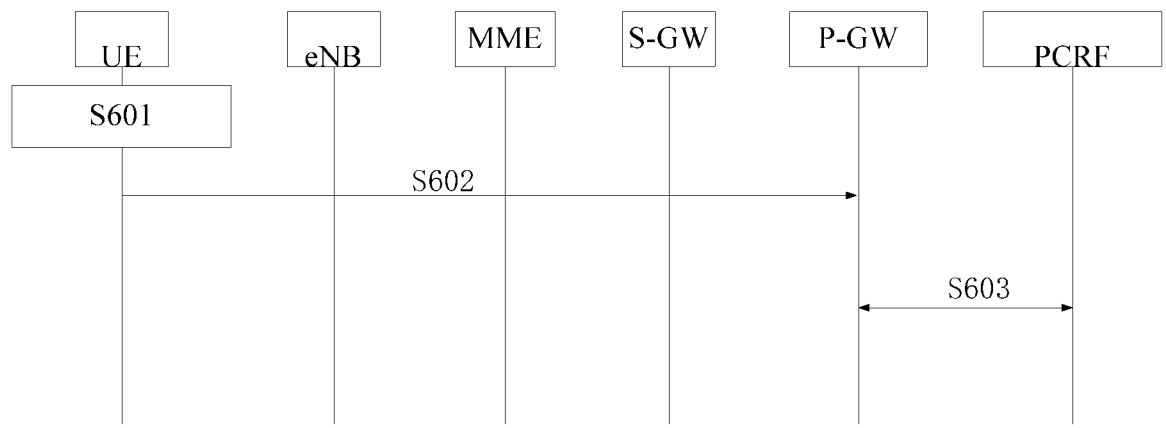
FIG. 6 is a flowchart of yet another embodiment of a method for data connection management provided by an embodiment of the present disclosure.

FIG. 6 is a flowchart of yet another embodiment of a method for data connection management provided by an embodiment of the present disclosure. In this embodiment, when a UE closes or opens a data connection, the UE notifies a P-GW of a network side to implement closing or opening the data connection in a data packet manner through a preset channel. A second appointed data packet sent by the UE is specifically first instruction information, and the second appointed data packet is used for instructing to close or open the data connection; when a target address of the second appointed data packet is a first preset value, and/or a target port number is a second preset value, the second appointed data packet is specifically used for instructing to close the data connection; and when the target address of the second appointed data packet is a third preset value, and/or the target port number is a fourth preset value, the second appointed data packet is specifically used for opening the data connection.

The method for data connection management includes the following.

S601: a UE obtains a second appointed data packet, wherein the second appointed data packet is used for instructing to close or open a data connection.

In this step, the second appointed data packet is specifically first instruction information, wherein the first instruction information, namely the second appointed data packet is used for instructing to close or open the data connection.

In a practical application, the UE attached to an EPS network maintains an attachment state, when the UE implements processing of closing or opening the data connection, the UE obtains the second appointed data packet, when a target address of the second appointed data packet is a first preset value, and/or a target port number is a second preset value, the second appointed data packet is specifically used for instructing to close the data connection; and when the target address of the second appointed data packet is a third preset value, and/or the target port number is a fourth preset value, the second appointed data packet is specifically used for opening the data connection.

Specifically, a user may trigger the UE to implement the processing of closing or opening the data connection, for example, the user enables the UE to implement the processing of closing or opening the data connection by running or operating an application program on the UE, wherein the application program may be a built-in application program of the UE (e.g., a built-in software or function of a UE operation system), and may also an application program additionally installed on the UE; the UE obtains the first instruction information, the UE may also implement the processing of closing or opening the data connection according to a configured policy, for example, when the configured policy is to close the data connection in the case of UE standby (e.g., screen off) and to open the data connection in the case of non-standby (e.g., screen on), the UE implements the processing of closing or opening the data connection according to the policy.

In this embodiment, the UE may also set a first policy for at least one bearer of the UE according to the first instruction information, wherein the first policy is used for stopping or starting the data transmission of at least one traffic flow in the at least one bearer; and the UE stops or starts the data transmission of the at least one traffic flow according to the first policy.

S602: the UE sends the second appointed data packet to a P-GW through a preset channel.

In this step, the UE sends the second appointed data packet to the P-GW through the preset channel having been set up between the UE and the P-GW for the data connection, for example, a GTP channel, wherein the second appointed data packet realizes instructing to close or open the data connection according to corresponding values of the target address and/or the target port number thereof.

S603: the P-GW obtains closing or opening data connection information according to the target address and/or target port number of the second appointed data packet, and correspondingly stops or starts the data transmission of at least one bearer of the UE according to the closing or opening data connection information.

In this step, when the target address of the second appointed data packet is the first preset value, and/or the target port number is the second preset value, the second appointed data packet corresponds to closing the data connection, then the P-GW obtains the closing data connection information according to the target address and/or target port number of the second appointed data packet, and the P-GW stops the data transmission of at least one bearer of the UE according to the closing data connection information.

When the target address of the second appointed data packet is the third preset value, and/or the target port number is the fourth preset value, the second appointed data packet corresponds to opening the data connection, then the P-GW obtains the opening data connection information according to the target address and/or target port number of the second appointed data packet, and the P-GW starts the data transmission of at least one bearer of the UE according to the opening data connection information.

The process that the P-GW stops or starts the data transmission of at least one bearer of the UE according to the closing or opening data connection information is similar to the process of stopping or starting the data transmission of at least one bearer of the UE according to the first instruction information in S304 in the above-mentioned embodiment, and may specifically refer to related descriptions of S304; wherein the action and function of the closing or opening data connection information are similar to those of the first instruction information in above-mentioned method embodiment corresponding to FIG. 3.

Optionally, the P-GW may also implement bearer deletion processing and bearer update processing, which may specifically refer to related descriptions in the method embodiments corresponding to FIG. 3 and FIG. 4, and will not be repeated redundantly herein.

In one implementation of this embodiment, the second appointed data packet includes second instruction information, wherein the second instruction information is used for instructing to close or open the data connection of a particular traffic flow; correspondingly, the P-GW stops or starts the data transmission of at least one bearer of the particular traffic flow of the UE according to the second appointed data packet. Related descriptions of the second instruction information are similar to those of the second instruction information in the method embodiment corresponding to FIG. 3, thus will not be repeated redundantly herein, and may specifically refer to related descriptions of the above-mentioned embodiment.

In this embodiment, when the UE implements closing or opening the data connection, the UE obtains the second appointed data packet used for instructing to close or open the data connection, wherein the second appointed data packet may be specially the first instruction information; the UE transmits the second appointed data packet to the P-GW of a network side through the preset channel, the P-GW stops or starts the data transmission of at least one bearer of the UE according to the second appointed data packet, in this way, the UE is unnecessary to be "always on", that is to say, when the UE is not in a use state, the UE implements closing the data connection, and the corresponding network side P-GW stops the data transmission of at least one bearer of the UE, such that consumptions of background data traffics caused by the "always on" of the UE may be avoided, and a traffic of a terminal may be effectively controlled, thus a data traffic and an additional cost of a user may be saved and a user experience may be improved.

Figure 7:
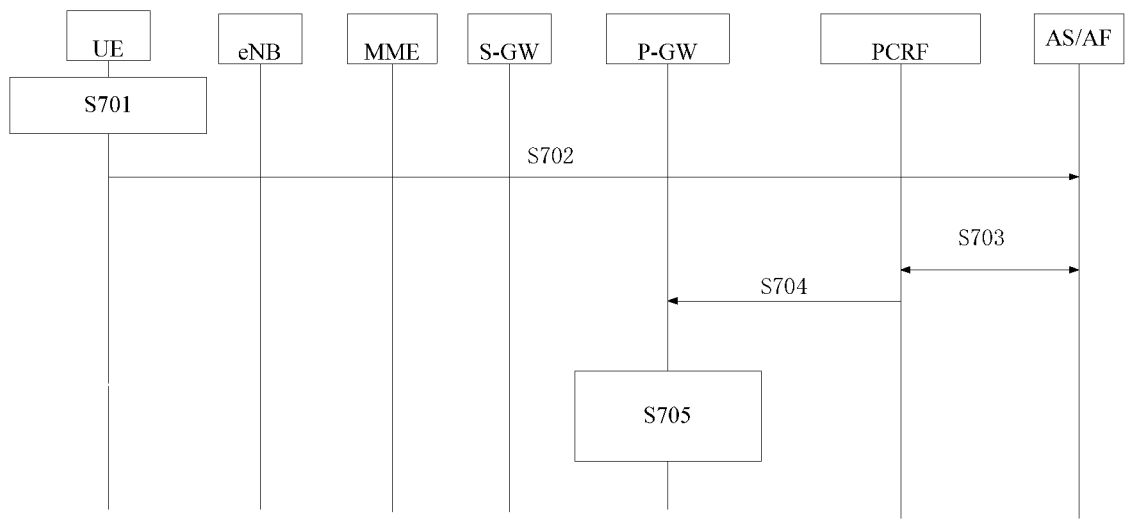
FIG. 7 is a flowchart of yet another embodiment of a method for data connection management provided by an embodiment of the present disclosure.

FIG. 7 is a flowchart of yet another embodiment of a method for data connection management provided by an embodiment of the present disclosure. In this embodiment, when a UE closes or opens a data connection, the UE notifies an AS (Application server)/AF (Application Function) of a network side to implement corresponding processing of closing or opening the data connection in a data packet manner through a preset channel, such that a P-GW of the network side stops or starts data transmission of at least one bearer of the UE; wherein a first appointed data packet sent by the UE comprises first instruction information, and the first instruction information is used for instructing to close or open the data connection.

S701: a UE obtains first instruction information, wherein the first instruction information is used for instructing to close or open a data connection.

S701 is similar to S301 in the above-mentioned embodiment, thus will not be repeated redundantly herein, and may specifically refer to related descriptions of S301.

S702: the UE sends a first appointed data packet to an AS/AF through a preset channel, wherein the first appointed data packet comprises the first instruction information.

In this step, the UE sends the first appointed data packet to a P-GW through the preset channel having been set up between the UE and the P-GW for the data connection, for example, a GTP channel, and the P-GW forwards the first appointed data packet to the AS/AF; wherein the first appointed data packet comprises the first instruction information, and the first instruction information is used for instructing to close or open the data connection.

S703: the AS/AF obtains the first instruction information from the first appointed data packet, and implements application service information update processing with a PCRF according to the first instruction information.

In this step, the AS/AF receives the first appointed data packet, and obtains the first instruction information from the first appointed data packet, wherein the first instruction information is used for instructing to close or open the data connection.

The AS/AF implements the application service information update processing with the PCRF according to the first instruction information, specifically, the AS/AF updates service information in a service session according to the first instruction information, if the first instruction information instructs to close the data connection, the AS/AF updates the service information to make it exclude any service information or sets all service information to be ineffective; if the first instruction information instructs to open the data connection, the AS/AF updates the service information to make it include service information of the UE related to the AS/AF or sets the existing service information to be effective. The AS/AF sends a modify session information request message including updated service information to the PCRF, for enabling the PCRF to implement policy update processing according to the updated service information, so as to enable the P-GW to implement the processing of closing or opening the data connection.

S704: after implementing an application service information update procedure, the PCRF sends a policy and charging rules update message to the P-GW, wherein the policy and charging rules update message comprises an access control policy used for closing or opening the data connection.

In this step, after implementing the application service information update procedure, the PCRF may send an update complete response to the AS/AF.

In addition, after implementing the application service information update procedure, the PCRF sends the policy and charging rules update (Policy and Charging Rules Provision) message to the P-GW, wherein the policy and charging rules update message comprises the access control policy used for closing or opening the data connection, the specific processing process may refer to related descriptions of method embodiments corresponding to FIG. 3 and FIG. 4, and will not be repeated redundantly herein.

S705: the P-GW stops or starts data transmission of at least one bearer of the UE according to the policy and charging rules update message.

In this step, the P-GW stops or starts the data transmission of at least one bearer of the UE according to the corresponding access control policy in the policy and charging rules update message, the specific processing process may refer to related descriptions of method embodiments corresponding to FIG. 3 and FIG. 4, and will not be repeated redundantly herein.

The P-GW may also implement bearer deletion processing and/or bearer update processing, which may specifically refer to related descriptions in the method embodiments corresponding to FIG. 3 and FIG. 4, and will not be repeated redundantly herein.

In this embodiment, after receiving the policy and charging rules update message, the P-GW may also send a policy and charging rules acknowledge (Policy and Charging Rules Ack) message to the PCRF, to notify the PCRF that the P-GW has received the policy and charging rules update message.

In one implementation of this embodiment, the first instruction information includes second instruction information, wherein the second instruction information is used for instructing to close or open the data connection of a particular traffic flow; i.e., the second instruction information is used for instructing to close or open a part of data connections. At this time, in step S703, the AS/AF updates the service information according to the particular traffic flow in the second instruction information. Specifically, when the second instruction information is used for instructing to close the data connection of the particular traffic flow, the AS/AF updates the service information to make it exclude service information of the particular traffic flow or sets the service information of the particular traffic flow to be ineffective. If the second instruction information instructs to open the data connection of the particular traffic flow, the AS/AF updates the service information to make it include the service information of the particular traffic flow or sets the service information of the particular traffic flow to be effective. The AS/AF sends the modify session information request message comprising the updated service information to the PCRF, for enabling the PCRF to implement the policy update processing according to the updated service information to obtain a first access control policy or a second access control policy, so as to enable the P-GW to implement the processing of closing or opening the data connection. Correspondingly, the P-GW stops the data transmission of at least one bearer of the particular traffic flow of the UE according to the first instruction information and/or the first access control policy, or the P-GW starts the data transmission of at least one bearer of the particular traffic flow of the UE according to the first instruction information and/or the second access control policy. Related descriptions of the second instruction information are similar to those of the second instruction information in the method embodiment corresponding to FIG. 3, thus will not be repeated redundantly herein, and may specifically refer to related descriptions of the above-mentioned embodiment.

In this embodiment, when the UE implements closing or opening the data connection, the UE obtains the first instruction information used for instructing to close or open the data connection; the UE transmits the first instruction information to the AS/AF of the network side through the preset channel, for enabling the AS/AF to implement corresponding processing of closing or opening the data connection, so as to enable the P-GW of the network side to stop or start the data transmission of at least one bearer of the UE, in this way, the UE is unnecessary to be "always on", that is to say, when the UE is not in a use state, the UE implements closing the data connection, and the corresponding network side P-GW stops the data transmission of at least one bearer of the UE, such that consumptions of background data traffics caused by the "always on" of the UE may be avoided, and a traffic of a terminal may be effectively controlled, thus a data traffic and an additional cost of a user may be saved and a user experience may be improved.

Figure 8:
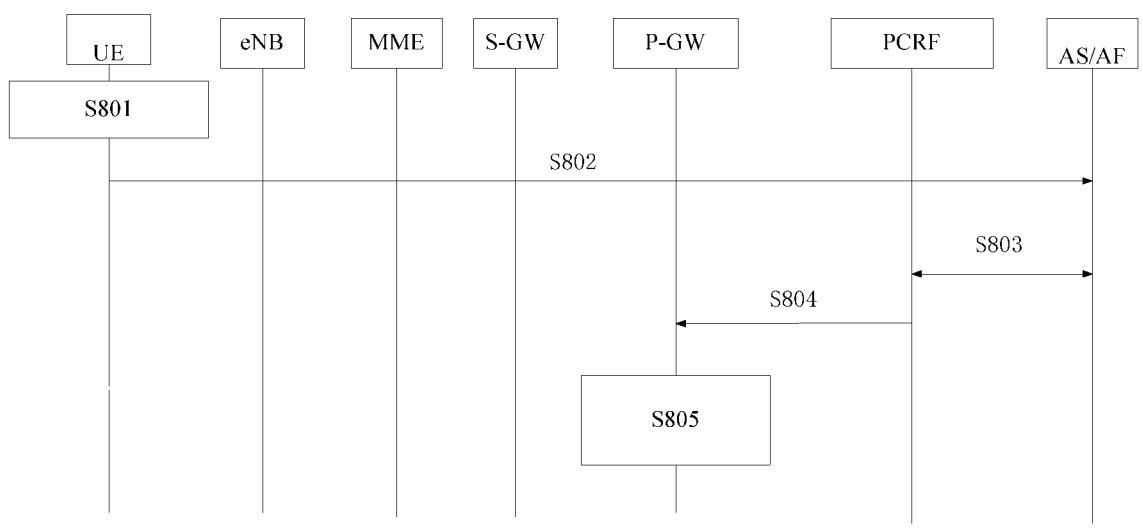
FIG. 8 is a flowchart of yet another embodiment of a method for data connection management provided by an embodiment of the present disclosure.

FIG. 8 is a flowchart of yet another embodiment of a method for data connection management provided by an embodiment of the present disclosure. In this embodiment, when a UE closes or opens a data connection, the UE notifies an AS/AF of a network side to implement closing or opening the data connection in a data packet manner through a preset channel, such that a P-GW of the network side stops or starts data transmission of at least one bearer of the UE. A second appointed data packet sent by the UE is specifically first instruction information, and the second appointed data packet is used for instructing to close or open the data connection; when a target address of the second appointed data packet is a first preset value, and/or a target port number is a second preset value, the second appointed data packet is specifically used for instructing to close the data connection; and when the target address of the second appointed data packet is a third preset value, and/or the target port number is a fourth preset value, the second appointed data packet is specifically used for opening the data connection.

The method for data connection management includes the following steps.

S801: a UE obtains a second appointed data packet, wherein the second appointed data packet is used for instructing to close or open a data connection.

S801 is similar to S601 in the above-mentioned embodiment, thus will not be repeated redundantly herein, and may specifically refer to related descriptions of S601.

S802: the UE sends the second appointed data packet to an AS/AF through a preset channel.

In this step, the UE sends the second appointed data packet to a P-GW through the preset channel having been set up between the UE and the P-GW for the data connection, for example, a GTP channel, the P-GW forwards the first appointed data packet to the AS/AF, wherein the second appointed data packet instructs to close or to open the data connection according to corresponding values of a target address and/or a target port number thereof.

S803: the AS/AF obtains closing or opening data connection information according to the target address and/or target port number of the second appointed data packet, and implements application service information update processing with a PCRF according to the closing or opening data connection information.

In this step, when the target address of the second appointed data packet is a first preset value, and/or the target port number is a second preset value, the second appointed data packet corresponds to closing the data connection, then the AS/AF obtains the closing data connection information according to the target address and/or target port number of the second appointed data packet. When the target address of the second appointed data packet is a third preset value, and/or the target port number is a fourth preset value, the second appointed data packet corresponds to opening the data connection, then the AS/AF obtains the opening data connection information according to the target address and/or target port number of the second appointed data packet. The process that the AS/AF implements the application service information update processing with the PCRF according to the closing or opening data connection information is similar to the process of implementing the application service information update processing with the PCRF according to the first instruction information in S703 in the above-mentioned embodiment, and may specifically refer to related descriptions of S703; wherein the action and function of the closing or opening data connection information are similar to those of the first instruction information in the method embodiment corresponding to FIG. 7.

S804: after implementing the application service information update processing, the PCRF generates a policy and charging rules update message, and sends the policy and charging rules update message to the P-GW.

S804 is similar to S704 of the above-mentioned embodiment, thus will not be repeated redundantly herein, and may specifically refer to related descriptions of S704.

S805: the P-GW stops or starts data transmission of at least one bearer of the UE according to the policy and charging rules update message.

S805 is similar to S705 in the above-mentioned embodiment, thus will not be repeated redundantly herein, and may specifically refer to related descriptions of S705.

The P-GW may also implement bearer deletion processing and/or bearer update processing, which may specifically refer to related descriptions in the method embodiments corresponding to FIG. 3 and FIG. 4, and will not be repeated redundantly herein.

In one implementation of this embodiment, the second appointed data packet includes second instruction information, wherein the second instruction information is used for instructing to close or open the data connection of a particular traffic flow; correspondingly, the P-GW stops the data transmission of at least one bearer of the particular traffic flow of the UE according to the second appointed data packet and/or a first access control policy, or the P-GW starts the data transmission of at least one bearer of the particular traffic flow of the UE according to the second appointed data packet and/or a second access control policy. Related descriptions of the second instruction information are similar to those of the second instruction information in the method embodiment corresponding to FIG. 3, thus will not be repeated redundantly herein, and may specifically refer to related descriptions of the above-mentioned embodiment.

In this embodiment, in S802, the UE may select to merely send the second appointed data packet to an appointed AS/AF, or respectively send the second appointed data packet to a plurality of AS/AF, and the AS/AF receiving the second appointed data packet implements subsequent processing. When the second appointed data packet includes the second instruction information, the UE may merely send the second instruction information to the AS/AF corresponding to the particular traffic flow.

In this embodiment, when the UE implements closing or opening the data connection, the UE obtains the second appointed data packet used for instructing to close or open the data connection, wherein the second appointed data packet may be specially the first instruction information; the UE transmits the second appointed data packet to the AS/AF of the network side through the preset channel, for enabling the AS/AF to implement corresponding processing of closing or opening the data connection, so as to enable the P-GW of the network side to stop or start the data transmission of at least one bearer of the UE, in this way, the UE is unnecessary to be "always on", that is to say, when the UE is not in a use state, the UE implements closing the data connection, and the corresponding network side P-GW stops the data transmission of at least one bearer of the UE, such that consumptions of background data traffics caused by the "always on" of the UE may be avoided, and a traffic of a terminal may be effectively controlled, thus a data traffic and an additional cost of a user may be saved and a user experience may be improved.

Figure 9:
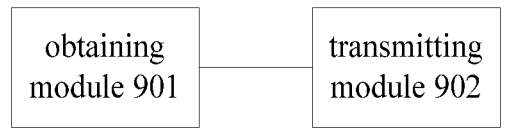
FIG. 9 is a first structure schematic diagram of an embodiment of a user equipment UE provided by an embodiment of the present disclosure.

FIG. 9 is a first structure schematic diagram of an embodiment of a user equipment UE provided by an embodiment of the present disclosure; the UE includes: an obtaining module 901, configured to obtain first instruction information, wherein the first instruction information is used for instructing to close or open a data connection; and a transmitting module 902, configured to transmit the first instruction information to a packet data network gateway P-GW, for enabling the P-GW to stop or start data transmission of at least one bearer of the UE according to the first instruction information.

The obtaining module 901 may specifically refer to related descriptions of S101 and S301; and functions of the transmitting module 902 may specifically refer to related descriptions of S102. The functions of the obtaining module 901 and the transmitting module 902 may be specifically achieved by a first processor.

In one implementation, on the basis of including the obtaining module 901 and the transmitting module 902, the UE may further include: a setting module, configured to set a first policy for the at least one bearer according to the first instruction information, wherein the first policy is used for stopping or starting the data transmission of at least one traffic flow in the at least one bearer; and a transmission control module, configured to stop or start the data transmission of the at least one traffic flow according to the first policy.

The functions of the setting module and the transmission control module may specifically refer to related descriptions of S301.

In another implementation, on the basis of including the obtaining module 901 and the transmitting module 902, the UE may further include: a deleting module, configured to receive a delete bearer request initiated by the P-GW and delete a part of bearers in the at least one bearer; a policy setting module, configured to set a second policy for a bearer not deleted in the at least one bearer according to the first instruction information, wherein the second policy is used for stopping the data transmission of at least one traffic flow in the bearer not deleted; a transmission stopping module, configured to stop the data transmission of the at least one traffic flow according to the second policy.

The functions of the deleting module, the policy setting module and the transmission stopping module may specifically refer to related descriptions of S304.

The functions of the setting module, the transmission control module, the deleting module, the policy setting module and the transmission stopping module may be achieved by a second processor in the processor.

Figure 10:
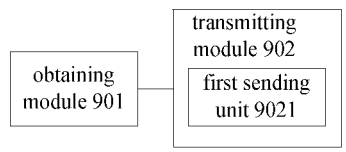
FIG. 10 is a second structure schematic diagram of an embodiment of a user equipment UE provided by an embodiment of the present disclosure.

In yet another implementation, the transmitting module 902 includes: a first sending unit 9021, as shown in FIG. 10. FIG. 10 is a second structure schematic diagram of an embodiment of a user equipment UE provided by an embodiment of the present disclosure.

The first sending unit 9021 is configured to send a service request message, a tracking area update request message, or a request bearer resource modification message to a mobility management entity MME, for enabling the MME to obtain the first instruction information from the service request message, the tracking area update request message or the request bearer resource modification message, and transmit the first instruction information to the P-GW through a serving gateway S-GW.

The functions of the first sending unit 9021 may specifically refer to related descriptions of S302-S303 and S402-S403.

The functions of the first sending unit 9021 may be specifically achieved by a first sender.

Figure 11:
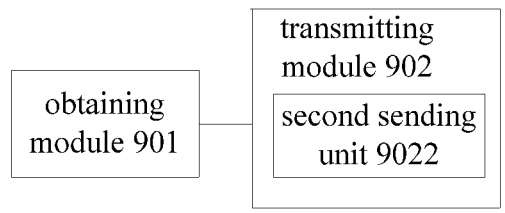
FIG. 11 is a third structure schematic diagram of an embodiment of a user equipment UE provided by an embodiment of the present disclosure.

In yet another implementation, the transmitting module 902 includes: a second sending unit 9022, as shown in FIG. 11. FIG. 11 is a third structure schematic diagram of an embodiment of a user equipment UE provided by an embodiment of the present disclosure.

The second sending unit 9022 is configured to send a first appointed data packet to the P-GW through a preset channel, wherein the first appointed data packet comprises the first instruction information.

The functions of the second sending unit 9022 may specifically refer to related descriptions of S502.

The functions of the second sending unit 9022 may be specifically achieved by a second sender.

Figure 12:
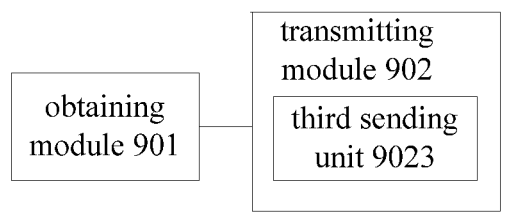
FIG. 12 is a fourth structure schematic diagram of an embodiment of a user equipment UE provided by an embodiment of the present disclosure.

In yet another implementation, the transmitting module 902 includes: a third sending unit 9023, as shown in FIG. 12. FIG. 12 is a fourth structure schematic diagram of an embodiment of a user equipment UE provided by an embodiment of the present disclosure.

The third sending unit 9023 is configured to send a first appointed data packet to the P-GW through a preset channel, to trigger the P-GW to forward the first appointed data packet to an application server AS/application function AF, for enabling the AS/AF to obtain the first instruction information from the first appointed data packet, and implement an application service information update procedure with a policy and charging rules function PCRF according to the first instruction information, and the PCRF to send a policy and charging rules update message to the P-GW after implementing the application service information update procedure, for enabling the P-GW to stop or start the data transmission of at least one bearer of the UE according to the policy and charging rules update message; wherein the policy and charging rules update message comprises an access control policy used for closing or opening the data connection.

The functions of the third sending unit 9023 may specifically refer to related descriptions of S702.

The functions of the third sending unit 9023 may be specifically achieved by a third sender.

Figure 13:
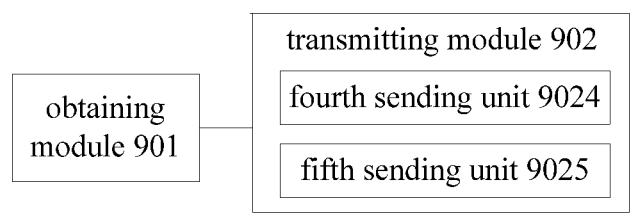
FIG. 13 is a fifth structure schematic diagram of an embodiment of a user equipment UE provided by an embodiment of the present disclosure.

In yet another implementation, the transmitting module 902 includes: a fourth sending unit 9024 or a fifth sending unit 9025, as shown in FIG. 13. FIG. 13 is a fifth structure schematic diagram of an embodiment of a user equipment UE provided by an embodiment of the present disclosure.

The fourth sending unit 9024 is configured to send a second appointed data packet to the P-GW through a preset channel, for enabling the P-GW to obtain closing data connection information according to a target address and/or target port number of the second appointed data packet, and stop the data transmission of at least one bearer of the UE according to the closing data connection information, wherein the target address of the second appointed data packet is a first preset value, and/or the target port number is a second preset value.

The fifth sending unit 9025 is configured to send a second appointed data packet to the P-GW through a preset channel, for enabling the P-GW to obtain opening data connection information according to a target address and/or target port number of the second appointed data packet, and start the data transmission of at least one bearer of the UE according to the opening data connection information, wherein the target address of the second appointed data packet is a third preset value, and/or the target port number is a fourth preset value.

The functions of the fourth sending unit 9024 and the fifth sending unit 9025 may specifically refer to related descriptions of S602.

The functions of the fourth sending unit 9024 may be specifically achieved by a fourth sender, and the functions of the fifth sending unit 9025 may be specifically achieved by a fifth sender.

Figure 14:
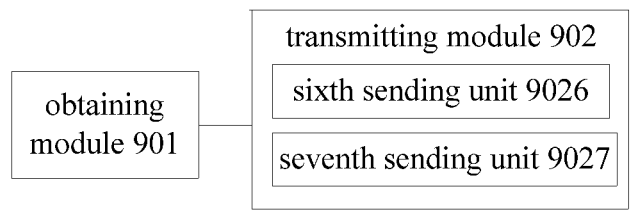
FIG. 14 is a sixth structure schematic diagram of an embodiment of a user equipment UE provided by an embodiment of the present disclosure.

In yet another implementation, the transmitting module 902 includes: a sixth sending unit 9026 or a seventh sending unit 9027, as shown in FIG. 14. FIG. 14 is a sixth structure schematic diagram of an embodiment of a user equipment UE provided by an embodiment of the present disclosure.

The sixth sending unit 9026 is configured to send a second appointed data packet to the P-GW through a preset channel, to trigger the P-GW to forward the second appointed data packet to an AS/AF, for enabling the AS/AF to obtain closing data connection information according to a target address and/or target port number of the second appointed data packet, and implement an application service information update procedure with a PCRF according to the closing data connection information, and the PCRF to send a policy and charging rules update message to the P-GW after implementing the application service information update procedure, for enabling the P-GW to stop the data transmission of at least one bearer of the UE according to the policy and charging rules update message; wherein the policy and charging rules update message comprises an access control policy used for closing the data connection; the target address of the second appointed data packet is a first preset value, and/or the target port number is a second preset value.

The seventh sending unit 9027 is configured to send a second appointed data packet to the P-GW through a preset channel, to trigger the P-GW to forward the second appointed data packet to an AS/AF, for enabling the AS/AF to obtain opening data connection information according to a target address and/or target port number of the second appointed data packet, and implement an application service information update procedure with a PCRF according to the opening data connection information, and the PCRF to send a policy and charging rules update message to the P-GW after implementing the application service information update procedure, for enabling the P-GW to start the data transmission of at least one bearer of the UE according to the policy and charging rules update message; wherein the policy and charging rules update message comprises an access control policy used for opening the data connection; the target address of the second appointed data packet is a third preset value, and/or the target port number is a fourth preset value.

The functions of the sixth sending unit 9026 and the seventh sending unit 9027 may specifically refer to related descriptions of S802.

The functions of the sixth sending unit 9026 may be specifically achieved by a sixth sender, and the functions of the seventh sending unit 9027 may be specifically achieved by a seventh sender.

In this embodiment, when the UE implements closing or opening the data connection, the UE obtains the first instruction information used for instructing to close or open the data connection; the UE transmits the first instruction information to the P-GW of a network side, for enabling the P-GW to stop or start the data transmission of at least one bearer of the UE according to the first instruction information, in this way, the UE is unnecessary to be "always on", that is to say, when the UE is not in a use state, the UE implements closing the data connection, and the corresponding network side P-GW stops the data transmission of at least one bearer of the UE, such that consumptions of background data traffics caused by the "always on" of the UE may be avoided, and a traffic of a terminal may be effectively controlled, thus a data traffic and an additional cost of a user may be saved and a user experience may be improved.

Figure 15:
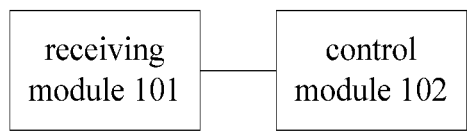
FIG. 15 is a first structure schematic diagram of an embodiment of a packet data network gateway (P-GW) provided by an embodiment of the present disclosure.

FIG. 15 is a first structure schematic diagram of an embodiment of a packet data network gateway P-GW provided by an embodiment of the present disclosure; the P-GW includes: a receiving module 101, configured to receive first instruction information transmitted by a user equipment UE, wherein the first instruction information is used for instructing to close or open a data connection; and a control module 102, configured to stop or start data transmission of at least one bearer of the UE according to the first instruction information.

The functions of the receiving module 101 and the control module 102 may respectively refer to related descriptions of S201 and S202. The functions of the receiving module 101 and the control module 102 may be specifically achieved by a third processor.

Figure 16:
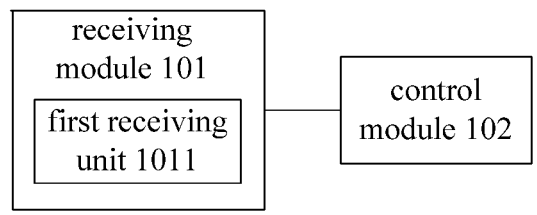
FIG. 16 is a second structure schematic diagram of an embodiment of a packet data network gateway (P-GW) provided by an embodiment of the present disclosure.

In one implementation, the receiving module 101 includes: a first receiving unit 1011, as shown in FIG. 16. FIG. 16 is a second structure schematic diagram of an embodiment of a packet data network gateway P-GW provided by an embodiment of the present disclosure.

The first receiving unit 1011 is configured to receive the first instruction information transmitted by a mobility management entity MME through a serving gateway S-GW, wherein the first instruction information is sent by the UE to the MME through a service request message, a tracking area update request message or a request bearer resource modification message, and the first instruction information is obtained by the MME from the service request message, the tracking area update request message or the request bearer resource modification message.

The functions of the first receiving unit 1011 may specifically refer to related descriptions of S304 and S404.

The functions of the first receiving unit 1011 may be specifically achieved by a first receiver.

Figure 17:
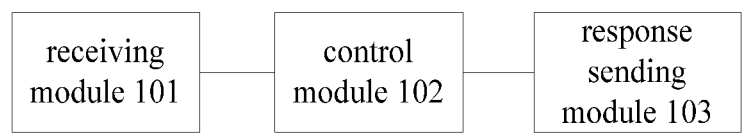
FIG. 17 is a third structure schematic diagram of an embodiment of a packet data network gateway (P-GW) provided by an embodiment of the present disclosure.

In another implementation, on the basis of including the receiving module 101 and the control module 102, the P-GW further includes: a response sending module 103, as shown in FIG. 17. FIG. 17 is a third structure schematic diagram of an embodiment of a packet data network gateway P-GW provided by an embodiment of the present disclosure.

The response sending module 103 is configured to, when the first instruction information is sent by the UE to the MME through the service request message or the tracking area update request message, after the P-GW stops or starts the data transmission of at least one bearer of the UE according to the first instruction information, send a modify bearer response to the MME through an S-GW, for enabling the MME to send a data connection update response to the UE according to the modify bearer response, to notify the UE that the P-GW has stopped or started the data transmission of at least one bearer of the UE.

The functions of the response sending module 103 may specifically refer to related descriptions of S305-S306.

The functions of the response sending module 103 may be specifically achieved by a fourth processor.

Figure 18:
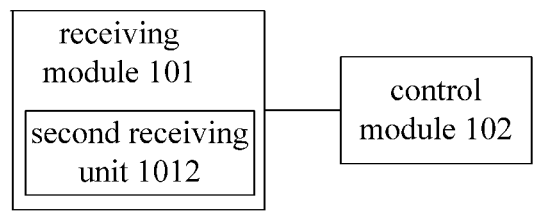
FIG. 18 is a fourth structure schematic diagram of an embodiment of a packet data network gateway (P-GW) provided by an embodiment of the present disclosure.

In yet another implementation, the receiving module 101 includes: a second receiving unit 1012, as shown in FIG. 18. FIG. 18 is a fourth structure schematic diagram of an embodiment of a packet data network gateway P-GW provided by an embodiment of the present disclosure.

The second receiving unit 1012 is configured to receive a first appointed data packet transmitted by the UE through a preset channel, wherein the first appointed data packet comprises the first instruction information.

The functions of the second receiving unit 1012 may specifically refer to related descriptions of S503.

The functions of the second receiving unit 1012 may be specifically achieved by a second receiver.

On the basis of the above-mentioned implementation, the control module 102 includes:

a first control unit, configured to implement policy update processing with a policy and charging rules function PCRF according to the first instruction information, receive an access control policy after the policy update processing, sent by the PCRF, and stop or start the data transmission of at least one bearer of the UE according to the first instruction information and/or the access control policy.

The functions of the first control unit may specifically refer to related descriptions of S304, S405 and S503.

The functions of the first control unit may be specifically achieved by a fifth processor.

Figure 19:
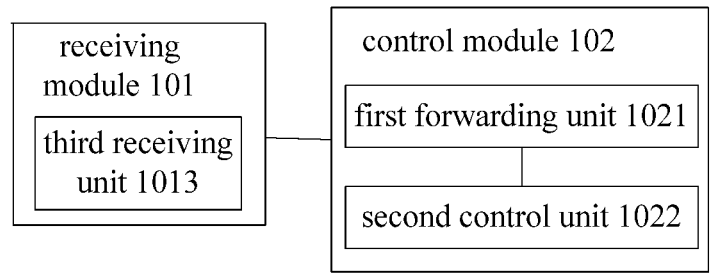
FIG. 19 is a fifth structure schematic diagram of an embodiment of a packet data network gateway (P-GW) provided by an embodiment of the present disclosure.

In yet another implementation, the receiving module 101 includes: a third receiving unit 1013, correspondingly, the control module 102 includes a first forwarding unit 1021 and a second control unit 1022, as shown in FIG. 19. FIG. 19 is a fifth structure schematic diagram of an embodiment of a packet data network gateway P-GW provided by an embodiment of the present disclosure.

The third receiving unit 1013 is configured to receive a first appointed data packet transmitted by the UE through a preset channel, wherein the first appointed data packet comprises the first instruction information.

The first forwarding unit 1021 is configured to forward the first appointed data packet to an application server AS/application function AF, for enabling the AS/AF to obtain the first instruction information from the first appointed data packet, and implement application service information update processing with a PCRF according to the first instruction information.

The second control unit 1022 is configured to receive a policy and charging rules update message generated by the PCRF after the application service information update processing, and stop or start the data transmission of at least one bearer of the UE according to the policy and charging rules update message; wherein the policy and charging rules update message comprises an access control policy used for closing or opening the data connection.

The functions of the third receiving unit 1013, the first forwarding unit 1021 and the second control unit 1022 may specifically refer to related descriptions of S703.

The functions of the third receiving unit 1013 may be specifically achieved by a third receiver; and the functions of the first forwarding unit 1021 and the second control unit 1022 may be specifically achieved by a sixth processor.

Figure 20:
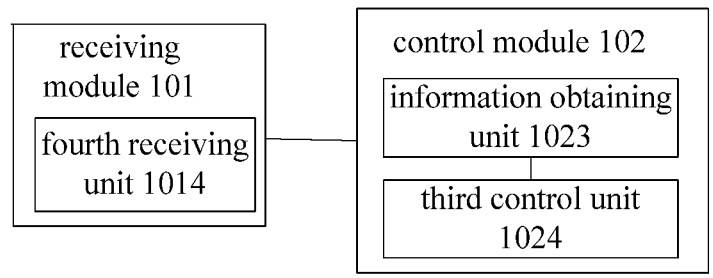
FIG. 20 is a sixth structure schematic diagram of an embodiment of a packet data network gateway (P-GW) provided by an embodiment of the present disclosure.

In yet another implementation, the receiving module 101 includes: a fourth receiving unit 1014, correspondingly, the control module 102 includes an information obtaining unit 1023 and a third control unit 1024, as shown in FIG. 20. FIG. 20 is a sixth structure schematic diagram of an embodiment of a packet data network gateway P-GW provided by an embodiment of the present disclosure.

The fourth receiving unit 1014 is configured to receive a second appointed data packet transmitted by the UE through a preset channel.

The information obtaining unit 1023 is configured to obtain closing or opening data connection information according to a target address and/or target port number of the second appointed data packet, wherein if the target address of the second appointed data packet is a first preset value, and/or the target port number is a second preset value, the second appointed data packet corresponds to closing the data connection; and if the target address of the second appointed data packet is a third preset value, and/or the target port number is a fourth preset value, the second appointed data packet corresponds to opening the data connection.

The third control unit 1024 is configured to correspondingly stop or start the data transmission of at least one bearer of the UE according to the closing or opening data connection information; or implement policy update processing with a PCRF according to the closing or opening data connection information, receive an access control policy sent by the PCRF, and stop or start the data transmission of at least one bearer of the UE according to the access control policy.

The functions of the fourth receiving unit 1014, the information obtaining unit 1023 and the third control unit 1024 may specifically refer to related descriptions of S603.

The functions of the fourth receiving unit 1014 may be specifically achieved by a fourth receiver; and the functions of the information obtaining unit 1023 and the third control unit 1024 may be specifically achieved by a seventh processor.

Figure 21:
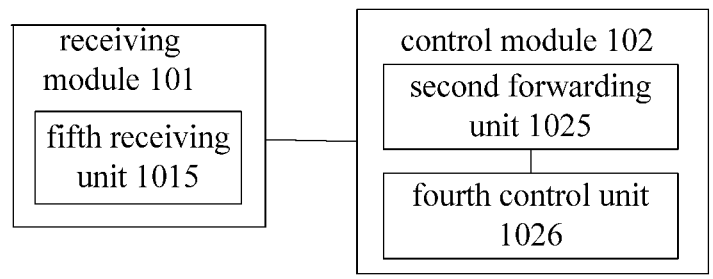
FIG. 21 is a seventh structure schematic diagram of an embodiment of a packet data network gateway (P-GW) provided by an embodiment of the present disclosure.

In yet another implementation, the receiving module 101 includes: a fifth receiving unit 1015, correspondingly, the control module 102 includes a second forwarding unit 1025 and a fourth control unit 1026, as shown in FIG. 21. FIG. 21 is a seventh structure schematic diagram of an embodiment of a packet data network gateway P-GW provided by an embodiment of the present disclosure.

The fifth receiving unit 1015 is configured to receive a second appointed data packet transmitted by the UE through a preset channel.

The second forwarding unit 1025 is configured to forward the second appointed data packet to an AS/AF, for enabling the AS/AF to obtain closing or opening data connection information according to a target address and/or target port number of the second appointed data packet, and implement application service information update processing with a PCRF according to the closing or opening data connection information, wherein if the target address of the second appointed data packet is a first preset value, and/or the target port number is a second preset value, the second appointed data packet corresponds to closing the data connection; and if the target address of the second appointed data packet is a third preset value, and/or the target port number is a fourth preset value, the second appointed data packet corresponds to opening the data connection;

the fourth control unit 1026 is configured to receive a policy and charging rules update message generated by the PCRF after the application service information update processing, and stop or start the data transmission of at least one bearer of the UE according to the policy and charging rules update message; wherein the policy and charging rules update message comprises an access control policy used for closing or opening the data connection.

The functions of the fifth receiving unit 1015, the second forwarding unit 1025 and the fourth control unit 1026 may specifically refer to related descriptions of S803-S805.

The functions of the fifth receiving unit 1015 may be specifically achieved by a fifth receiver; and the functions of the second forwarding unit 1025 and the fourth control unit 1026 may be specifically achieved by an eighth processor.

In yet another implementation, the control module 102 includes: a bearer deleting unit, configured to implement a bearer deletion flow to delete other bearers excluding a default bearer in the at least one bearer, or delete at least one appointed bearer excluding the default bearer in the at least one bearer; and a fifth control unit, configured to stop the data transmission of a bearer not deleted in the at least one bearer according to the first instruction information.

The fifth control unit includes: a setting subunit, configured to set a second policy for the bearer not deleted according to the first instruction information, wherein the second policy is used for stopping the data transmission of at least one traffic flow in the bearer not deleted; and a stopping subunit, configured to stop the data transmission of the at least one data flow according to the second policy.

In yet another implementation, the P-GW further includes: a bearer updating module, configured to implement a bearer update flow after the P-GW implements bearer deletion processing to delete other bearers excluding the default bearer in the at least one bearer.

In yet another implementation, the control module 102 may include: a setting unit, configured to set a third policy for the at least one bearer according to the first instruction information, wherein the third policy is used for starting the data transmission of at least one traffic flow in a bearer not deleted; and a starting unit, configured to start the data transmission of the at least one data flow according to the third policy.

The functions of the bearer deleting unit, the fifth control unit, the setting subunit, the stopping subunit, the bearer updating module, the setting unit and the starting unit may specifically refer to related descriptions of S304 and S405.

The functions of the bearer deleting unit, the fifth control unit, the setting subunit, the stopping subunit, the bearer updating module, the setting unit and the starting unit may be specifically achieved by a ninth processor.

In this embodiment, when the UE implements closing or opening the data connection, the P-GW receives the first instruction information transmitted by the UE and used for instructing to close or open the data connection; the P-GW stops or starts the data transmission of at least one bearer of the UE according to the first instruction information, in this way, the UE is unnecessary to be "always on", that is to say, when the UE is not in a use state, the UE implements closing the data connection, and the corresponding network side P-GW stops the data transmission of at least one bearer of the UE, such that consumptions of background data traffics caused by the "always on" of the UE may be avoided, and a traffic of a terminal may be effectively controlled, thus an additional cost of a user may be reduced.

Figure 22:
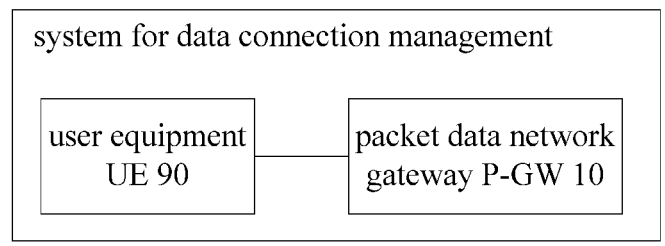
FIG. 22 is a structure schematic diagram of an embodiment of a system for data connection management provided by an embodiment of the present disclosure.

FIG. 22 is a structure schematic diagram of an embodiment of a system for data connection management provided by an embodiment of the present disclosure. The system for data connection management includes: a user equipment UE 90 and a packet data network gateway P-GW 10, wherein the functions of the user equipment UE are similar to the functions of the UE in the apparatus embodiments corresponding to FIG. 9, thus will not be repeated redundantly herein and may specifically refer to related descriptions of the above-mentioned embodiments; the functions of the packet data network gateway P-GW are similar to the functions of the P-GW in the apparatus embodiments corresponding to FIG. 10, thus will not be repeated redundantly herein and may specifically refer to related descriptions of the above-mentioned embodiments.

On the basis of including the UE 90 and the P-GW 10, the system for data connection management may further include: an eNB, an MME, an S-GW and a PCRF, the functions of the eNB, the MME, the S-GW and the PCRF may specifically refer to related descriptions of all the above-mentioned embodiments, and will not be repeated redundantly herein.

In addition, the system for data connection management may further include an AS/AF, the functions of the AS/AF may specifically refer to related descriptions of the method embodiments corresponding to FIG. 7 and FIG. 8, and will not be repeated redundantly herein.

In this embodiment, when the UE implements closing or opening the data connection, the UE obtains the first instruction information used for instructing to close or open the data connection; the UE transmits the first instruction information to the P-GW of a network side, and the P-GW stops or starts the data transmission of at least one bearer of the UE according to the first instruction information, in this way, the UE is unnecessary to be "always on", that is to say, when the UE is not in a use state, the UE implements closing the data connection, and the corresponding network side P-GW stops the data transmission of at least one bearer of the UE, such that consumptions of background data traffics caused by the "always on" of the UE may be avoided, and a traffic of a terminal may be effectively controlled, thus a data traffic and an additional cost of a user may be saved and a user experience may be improved.

It should be noted that, the embodiments in the description are described in a progressive manner, and what is highlighted in each embodiment is the difference from other embodiments, and the identical or similar parts between the embodiments may refer to each other. For the apparatus embodiments, they are basically similar to the method embodiments, thus are described simply, and related parts may refer to parts of illustration of the method embodiments.

It should be noted that, in this paper, such relationship terms as first, second and the like are merely used for distinguishing one entity or operation from another entity or operation, but not necessarily require or imply that any actual relationship or sequence exist between these entities or operations. Moreover, the terms "include", "comprise" or any other variants are intended to cover non-exclusive inclusion, such that a process, a method, an object or an apparatus including a series of factors not only includes those factors, but also includes other factors not explicitly listed, or further includes the inherent factors of this process, method, object or apparatus. In the absence of more limited conditions, factors limited by the statement "includes a . . . " does not exclude the possibility that the process, method, object or apparatus including the factors also has additional identical factors.

Those of ordinary skill in the art may understand that all or a part of the steps in the above-mentioned embodiments may be implemented by hardware, or by a program instructing related hardware, the program may be stored in a computer readable storage medium, and the above-mentioned storage medium may be a read-only memory, a magnetic disk, an optical disk or the like.

The foregoing descriptions are merely preferred embodiments of the present disclosure, rather than limiting the present disclosure. Any modifications, equivalent substitutions, improvements and the like made within the principle of the present disclosure should be encompassed in the protection scope of the present disclosure.

What is claimed is:

1. A method, comprising:
   obtaining, by a user equipment (UE), first instruction information, wherein the first instruction information instructs to close a data connection;
   in response to obtaining the first instruction information, closing, by the UE, the data connection; and
   transmitting, by the UE, the first instruction information to a packet data network gateway via a mobility management entity and a serving gateway, wherein the first instruction information enables the packet data network gateway to stop data transmission of at least one bearer of the UE according to the first instruction information;
   wherein the data connection is of a particular traffic flow, and the first instruction information comprises: identification information of the particular traffic flow or information of an application program corresponding to the particular traffic flow;
   wherein the identification information of the particular traffic flow comprises: a source internet protocol (IP) address, a target IP address, a source port number, a target port number, or a protocol type of the particular traffic flow; and
   wherein the information of the application program corresponding to the particular traffic flow comprises: an application program identifier, an application program title or an application program serial number.

2. The method of claim 1, wherein the obtaining of the first instruction information is triggered by a user of the UE.

3. The method of claim 1, further comprising:
   setting, by the UE, a first policy for the at least one bearer according to the first instruction information, wherein the first policy instructs to stop the data transmission of at least one traffic flow in the at least one bearer; and
   stopping, by the UE, the data transmission of the at least one traffic flow according to the first policy.

4. The method of claim 1, wherein the first instruction information is transmitted to the packet data network gateway in a service request message.

5. The method of claim 1, wherein the first instruction information is transmitted to the packet data network gateway in a tracking area update request message.

6. The method of claim 1, wherein the first instruction information is transmitted to the packet data network gateway in a request bearer resource modification message.

7. The method of claim 1, further comprising:
receiving, by the UE, a delete bearer request from the packet data network gateway;
deleting, by the UE, a first bearer in response to the delete bearer request, wherein the at least one bearer includes the first bearer and a second bearer, and the second bearer is not deleted in response to the delete bearer request;
setting, by the UE, a second policy for the second bearer according to the first instruction information, wherein the second policy instructs to stop a data transmission of at least one traffic flow in the second bearer; and
stopping, by the UE, the data transmission of the at least one traffic flow according to the second policy.

8. The method of claim 1, further comprising:
after closing the data connection, obtaining, by the UE, third instruction information, wherein the third instruction information instructs to open the data connection;
opening, by the UE, the data connection in response to the third instruction information; and
transmitting, by the UE, the third instruction information to the packet data network gateway.

9. A user equipment (UE), comprising:
an interface;
a processor; and
a non-transitory computer-readable storage medium storing a program to be executed by the processor, the program including instructions to:
obtain, using the interface, first instruction information, wherein the first instruction information instructs to close a data connection;
close the data connection in response obtaining to the first instruction information; and
transmit the first instruction information to a packet data network gateway via a mobility management entity and a serving gateway, wherein the first instruction information enables the packet data network gateway to stop data transmission of at least one bearer of the UE according to the first instruction information;
wherein the data connection is of a particular traffic flow, and the first instruction information comprises: identification information of the particular traffic flow or information of an application program corresponding to the particular traffic flow;
wherein the identification information of the particular traffic flow comprises: a source internet protocol (IP) address, a target IP address, a source port number, a target port number, or a protocol type of the particular traffic flow; and
wherein the information of the application program corresponding to the particular traffic flow comprises: an application program identifier, an application program title or an application program serial number.

10. The UE of claim 9, wherein obtaining the first instruction information is triggered by a user of the UE.

11. The UE of claim 9, wherein the program further includes instructions to:
set a first policy for the at least one bearer according to the first instruction information, wherein the first policy instructs to stop the data transmission of at least one traffic flow in the at least one bearer; and
stop the data transmission of the at least one traffic flow according to the first policy.

12. The UE of claim 9, wherein the first instruction information is transmitted to the packet data network gateway in a request bearer resource modification message.

13. The UE of claim 9, wherein the program further includes instructions to:
receive, using the interface, a delete bearer request from the packet data network gateway;
delete a first bearer in response to the delete bearer request, wherein the at least one bearer includes the first bearer and a second bearer, and the second bearer is not deleted in response to the delete bearer request;
set a second policy for the second bearer according to the first instruction information, wherein the second policy instructs to stop data transmission of at least one traffic flow in the second bearer; and
stop the data transmission of the at least one traffic flow according to the second policy.

14. The UE of claim 9, wherein the program further include instructions to:
after closing the data connection, obtain, using the interface, third instruction information, wherein the third instruction information instructs to open the data connection;
open the data connection in response to the third instruction information; and
transmit, using the interface, the third instruction information to the packet data network gateway.

15. A non-transitory computer-readable medium storing computer instructions for execution by one or more processors, wherein, when the computer instructions are executed by the one or more processors, the computer instructions instruct the one or more processors to perform operations of:
obtaining first instruction information, wherein the first instruction information instructs to close a data connection;
closing the data connection in response to obtaining the first instruction information; and
transmitting the first instruction information to a packet data network gateway via a mobility management entity and a serving gateway, wherein the first instruction information enables the packet data network gateway to stop data transmission of at least one bearer of a user equipment (UE) according to the first instruction information;
wherein the data connection is of a particular traffic flow, and the first instruction information comprises: identification information of the particular traffic flow or information of an application program corresponding to the particular traffic flow;
wherein the identification information of the particular traffic flow comprises: a source internet protocol (IP) address, a target IP address, a source port number, a target port number, or a protocol type of the particular traffic flow; and
wherein the information of the application program corresponding to the particular traffic flow comprises: an application program identifier, an application program title or an application program serial number.

* * * * *